United States Patent
Brown et al.

(10) Patent No.: US 12,178,227 B2
(45) Date of Patent: Dec. 31, 2024

(54) HIGH PROTEIN FOOD

(71) Applicant: General Mills, Inc., Minneapolis, MN (US)

(72) Inventors: Allison Brown, Minneapolis, MN (US); Catherine Davlin, Minneapolis, MN (US); Sara Rosene, New Hope, MN (US); Jon Duke Seibold, Mahtomedi, MN (US); Natasha Weatherby, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 417 days.

(21) Appl. No.: 17/168,324

(22) Filed: Feb. 5, 2021

(65) Prior Publication Data

US 2021/0244056 A1   Aug. 12, 2021

Related U.S. Application Data

(60) Provisional application No. 62/971,622, filed on Feb. 7, 2020.

(51) Int. Cl.
*A23L 25/00* (2016.01)
*A23D 9/007* (2006.01)
*A23J 3/14* (2006.01)
*A23L 33/105* (2016.01)

(52) U.S. Cl.
CPC ............. *A23L 25/30* (2016.08); *A23D 9/007* (2013.01); *A23J 3/14* (2013.01); *A23L 33/105* (2016.08)

(58) Field of Classification Search
CPC ...... A23L 25/30; A23L 33/105; A23L 33/185; A23L 25/10; A23J 3/14; A23V 2250/54
See application file for complete search history.

(56) References Cited

U.S. PATENT DOCUMENTS

| | | | |
|---|---|---|---|
| 3,580,729 A | 5/1971 | Darragh et al. | |
| 3,882,254 A | 5/1975 | Gooding | |
| 4,942,055 A * | 7/1990 | Avera | A23L 25/30 426/633 |

(Continued)

FOREIGN PATENT DOCUMENTS

| | | |
|---|---|---|
| CA | 2401114 | 10/2001 |
| CA | 2877120 | 12/2013 |

(Continued)

OTHER PUBLICATIONS

Heussen, P., et. al., "Practical Food Applications of Differential Scanning Calorimetry". Jan. 2011, Perkin Elmer (Year: 2011).*

(Continued)

*Primary Examiner* — Donald R Spamer
*Assistant Examiner* — Jeffrey D Benson
(74) *Attorney, Agent, or Firm* — Jordan IP Law, LLC; Rachel A. Kahler

(57) ABSTRACT

Described herein is a food that is suitable for use as a filling or topping for a shelf stable snack. The food has a protein content of at least 25% by weight, and a nut butter content of at least 50% by weight. The food retains a desirable eating experience, similar to a stabilized nut butter spread despite being resistant to melting and deformation during shipping, handling, and storage.

12 Claims, 9 Drawing Sheets

(56) References Cited

U.S. PATENT DOCUMENTS

| | | | |
|---|---|---|---|
| 5,433,970 A * | 7/1995 | Wong | A23L 25/30 |
| | | | 426/519 |
| 5,490,999 A | 2/1996 | Villagran et al. | |
| 5,508,057 A | 4/1996 | Wong et al. | |
| 5,518,755 A | 5/1996 | Wong et al. | |
| 6,706,311 B2 | 3/2004 | Wong et al. | |
| 9,005,685 B2 | 4/2015 | Cotton et al. | |
| 2002/0037355 A1 | 3/2002 | Wong et al. | |
| 2004/0208962 A1 | 10/2004 | Eberhart et al. | |
| 2005/0142276 A1 | 6/2005 | Slesinski et al. | |
| 2006/0051474 A1 | 3/2006 | Furlong et al. | |
| 2014/0127387 A1 * | 5/2014 | Wassell | A23D 9/013 |
| | | | 426/607 |
| 2016/0021916 A1 | 1/2016 | Deo et al. | |
| 2016/0316778 A1 | 11/2016 | Nagy et al. | |
| 2018/0368452 A1 * | 12/2018 | Shoop | A23L 7/126 |

FOREIGN PATENT DOCUMENTS

| | | |
|---|---|---|
| CN | 103919193 | 7/2014 |
| EP | 0497439 | 5/1992 |
| GB | 2007961 | 5/1979 |
| JP | 3085962 | 9/2000 |
| WO | WO 1992/020243 | 11/1992 |
| WO | WO 2001/072146 | 10/2001 |
| WO | WO 2018/236365 | 12/2018 |
| WO | WO 2019/063824 | 4/2019 |

OTHER PUBLICATIONS

FnB News, "Measuring dropping point of fat or oil using Mettler Toledo's instruments," Aug. 12, 2011, [downloaded Oct. 18, 2022], From the Internet <www.fnbnews.com/Top-News/Measuring-dropping-point-of-fat-or-oil-using-Mettler-Toledos-instruments> (Year: 2011).*

Fediol, "Fatty Acids," 2022, [downloaded Oct. 18, 2022]. From the Internet <https://www.fediol.eu/web/fatty acids/1011306087/list1187970103/f1.html> (Year: 2022).*

Mobin A, "Whey Protein Vs Soy Protein—Which One To Consider?" Sep. 21, 2018, [downloaded Oct. 18, 2022]. From the Internet <https://asitisnutrition.com/blogs/health/soy-protein-vs-whey-protein> (Year: 2018).*

Slocum M, "Peanut Butter White Chocolate," Mar. 20, 2017, [downloaded Oct. 5, 2022], From the Internet <https://wholenaturallife.com/peanut-butter-white-chocolate/> (Year: 2017).*

Azure Standard, "Azure Market Organics Palm Kernel Stearin, Organic," Nov. 15, 2016, retrieved Jul. 10, 2023 [online]. Found on the Internet <https://www.azurestandard.com/shop/product/food/oils-fats/palm-kernel-stearin/palm-kernel-stearin-organic/19698> (Year: 2016).*

Ngatirah, N, et. al., "Enzymatic Glycerolysis of Palm Kernel Olein-Stearin Blend for Monolaurin Synthesis as an Emulsifier and Antibacterial," Foods 2022, 11, 2412. (Year: 2022).*

ADM, "Soy Protein," retrieved Jul. 11, 2023 [online]. Found on the Internet <https://www.adm.com/en-us/products-services/human-nutrition/products/alternative-proteins/soy-protein> (Year: 2023).*

Yeh et al., "*Optimizing Protein- and Vitamin-Fortified Peanut Spreads Containing Soybean or Milk Powder*", Journal of Food Quality, vol. 26, No. 3, pp. 243-256, 2003.

Berk, "*Technology of Production of Edible Flours and Protein Products from Soybeans*", Food and Agricultural Organization of the United Nations Rome, FAO Agricultural Services Bulletin, No. 97, 1992.

Ehrenhauser, "*Size Matters: Crystal Size Analysis for the Louisiana Sugar Industry*", Retrieved from the Internet: https://web.archive.org/web/20180414093537/https://www.Jsuagreenter.com/profiles/Jbenedict/articles/page1491324916020, 2018.

Shakeradekani et al., "*Textural, Rheological and Sensory Properties and Oxidative Stability of Nut Spreads—A Review*", Int. Journal of Molecular Sciences, No. 14, pp. 4223-4241, 2013.

Dayrit, "*The Properties of Lauric Acid and Their Significance in Coconut Oil*", Journal of the American Chemists' Society, vol. 92, Issue 1, pp. 1-15, 2015.

Jeyarani et al., "*Trans-Free Plastic Shortenings from Coconut Stearin and Palm Stearin Blends*", Food Chemistry, vol. 114, Issue 1, pp. 270-275, 2009.

* cited by examiner

HIGH PROTEIN FOOD

CROSS REFERENCE TO RELATED APPLICATIONS

This application claims the benefit of U.S. Provisional Patent Application Ser. No. 62/971,622, which was filed on Feb. 7, 2020 and titled "High Protein Food". The entire content of this application is incorporated by reference.

BACKGROUND

Consumers are increasingly looking for foods that meet their nutritional needs without requiring preparation. Ready-to-eat protein products meet a need for consumers. Ready-to-eat protein products are particularly challenging because high protein content can contribute a number of undesired texture and flavor attributes to a food.

Nut butter spreads, such as natural nut butters and stabilized nut butters, are foods with a relatively high protein content that many consumers enjoy due to their flavor and convenience as a food. Consumers particularly enjoy texture attributes, including creaminess and mouth coating, that are characteristic of nut butters. Consumers also enjoy other nut butter-based foods that share similar flavor to nut butter spreads. However, as additional ingredients are combined with nut butter to achieve properties suitable for nut butter-based foods other than nut butter spreads, it is particularly difficult to retain the texture attributes characteristic of nut butters that consumers enjoy.

SUMMARY

The present disclosure relates to a high protein food that has a desirable texture and an extended shelf life.

Provided herein is a food. In some embodiments, the food can include nut butter in an amount of at least 50% by weight of the food; at least 25% protein by weight of the food, the protein including a powdered protein ingredient contributing at least 12% protein by weight of the food; a stabilizing fat in an amount of about 10% to about 20% by weight of the food; a powdered food ingredient in an amount of about 8% to about 25% by weight of the food; a differential scanning calorimetry (DSC) profile having a stabilizing fat endothermic peak between 30° C. and 35° C., and a rheology inflection midpoint at 21° C. ($RIM_{21}$) and a rheology inflection midpoint at 37° C. ($RIM_{37}$), where the $RIM_{37}$ is at least $1 \times 10^1$ Pa greater than the $RIM_{21}$.

In some embodiments, the DSC profile can exhibit a curve that has less than 10% of its area between 35° C. and 70° C.

In some embodiments, the stabilizing fat can have a Mettler Dropping Point of from about 38° C. to about 45° C., and a 10° C. to 40° C. solid fat content ($SFC_{10-40}$) profile, the $SFC_{10-40}$ profile having a formula of y=mx+b, where
y is solid fat content,
x is temperature in Celsius,
m is slope having a value between about −2 and about −5, and
b is a y-intercept having a value between about 95 and about 140.

In some embodiments, the stabilizing fat can have a $SFC_{10-40}$ profile with a formula of y=mx+b, where
y is solid fat content,
x is temperature in Celsius,
m is slope having a value between about −2 and about −3, and
b is a y-intercept having a value between about 95 and about 110.

In some embodiments, the stabilizing fat can have a 26.7° C. to 40° C. solid fat content ($SFC_{27-40}$) profile, the $SFC_{27-40}$ profile having a formula of y=mx+b, where
y is solid fat content,
x is temperature in Celsius,
m is slope having a value between about −1.5 and about −5, and
b is a y-intercept having a value between about 70 and about 150.

In some embodiments, the stabilizing fat can have a $SFC_{27-40}$ profile with a formula of y=mx+b, where
y is solid fat content,
x is temperature in Celsius,
m is slope having a value between about −1.5 and about −2.5, and
b is a y-intercept having a value between about 70 and about 85.

In some embodiments, the stabilizing fat can have a $SFC_{10-27}$ profile with a formula of y=mx+b, where
y is solid fat content,
x is temperature in Celsius,
m is slope having a value between about −1.5 and about −3, and
b is a y-intercept having a value between about 100 and about 130.

In some embodiments, the stabilizing fat can have a $SFC_{10-27}$ profile with a formula of y=mx+b, where
y is solid fat content,
x is temperature in Celsius,
m is slope having a value between about −1.8 and about −2.5, and
b is a y-intercept having a value between about 105 and about 120.

In some embodiments, a food provided herein can have a $RIM_{37}$ that is from about $1 \times 10^2$ to $1 \times 10^4$ Pa greater than the $RIM_{21}$.

In some embodiments, a food provided herein can have at least 25% protein by weight of the food, the protein including a powdered protein ingredient contributing at least 12% protein by weight of the food; a nut butter in an amount of at least 50% by weight of the food; a stabilizing fat in an amount of about 10% to about 20% by weight of the food, the stabilizing fat having a Mettler Dropping Point of from about 38° C. to about 45° C., and a 10° C. to 40° C. solid fat content ($SFC_{10-40}$) profile, the $SFC_{10-40}$ profile having a formula of y=mx+b, where
y is solid fat content,
x is temperature in Celsius,
m is slope having a value between about −2 and about −5, and
b is a y-intercept having a value between about 95 and about 140; and a powdered food ingredient in an amount of about 8% to about 25% by weight of the food.

In some embodiments, a stabilizing fat can include a palm oil, a palm stearin, a palm kernel oil, a palm kernel stearin, or a coconut oil. In some embodiments, a stabilizing fat can include a palm stearin and a palm oil.

In some embodiments, a food can include nut butter in an amount of from 50% to about 65%, or from 50% to about 60%, by weight of the food.

In some embodiments, a nut butter in a food provided herein can comprise peanut butter, almond butter, or cashew butter.

In some embodiments, a powdered food ingredient can include a sugar or a sugar alcohol in an amount of about 6% to about 20% by weight of the food.

In some embodiments, a stabilizing fat can contribute lauric acid in an amount of about 3% to about 10% by weight of the food.

In some embodiments, a powdered protein ingredient can comprise whey protein and soy protein, the whey protein and soy protein included at a ratio of from about 30:70 to about 70:30.

In some embodiments, a powdered protein ingredient can comprise whey protein isolate in an amount of from about 5% to about 15% by weight of the food and soy protein isolate in an amount of from about 5% to about 15% by weight of the food.

In some embodiments, a food provided herein can include a defatted nut flour in an amount of up to about 10% by weight of the food.

In some embodiments, a powdered protein ingredient and a powdered food ingredient can each include particles, where at least 80% of the pass through a No. 325 mesh.

Also provided herein are methods of making a food. A method can include combining a melted stabilizing fat with a nut butter to make a fat and nut butter mixture, and combining the fat and nut butter mixture with a powdered protein ingredient and a powdered food ingredient to make the food.

In some embodiments, the stabilizing fat has a melting point and the fat and nut butter mixture is combined with the powdered protein ingredient and the powdered food ingredient at a temperature at or above the melting point of the stabilizing fat.

These and various other features and advantages will be apparent from a reading of the following detailed description.

DETAILED DESCRIPTION

Figure 1:
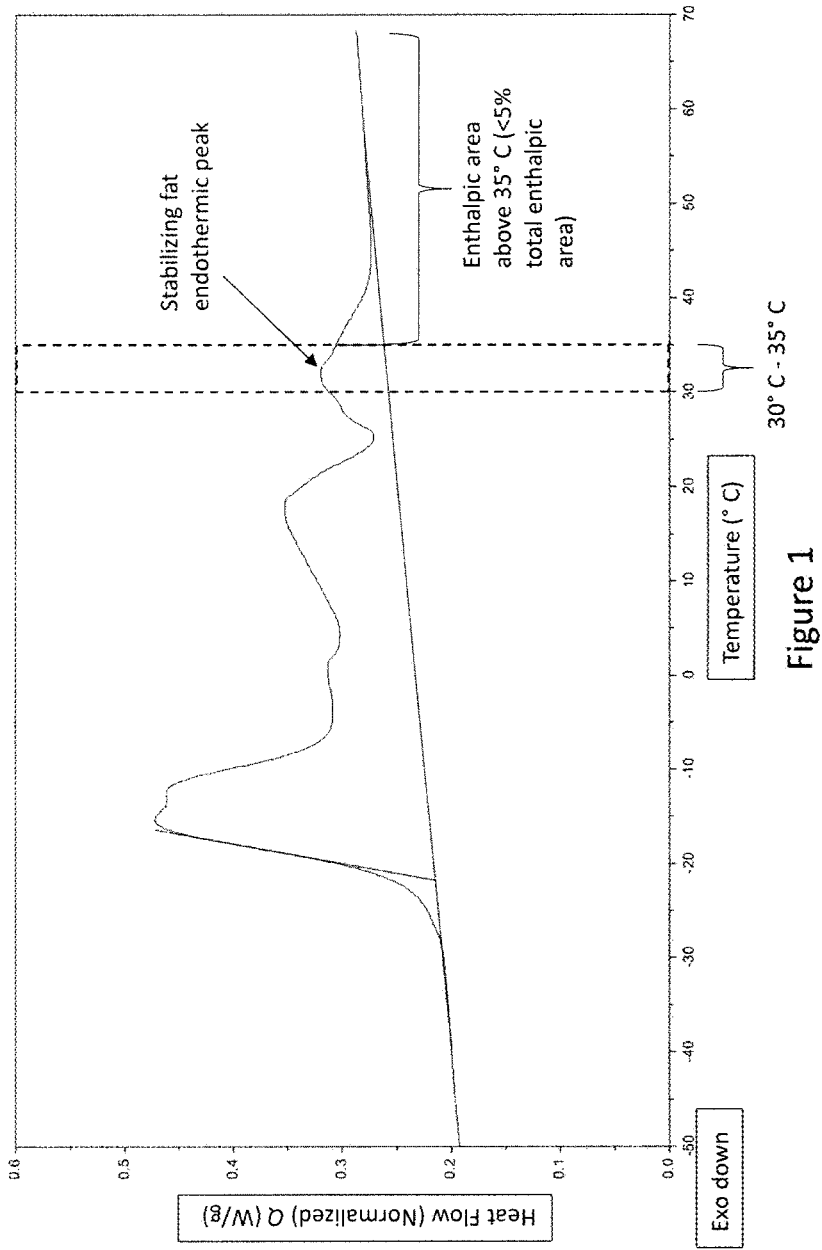
FIG. 1 shows a DSC profile of a food provided herein. The DSC profile exhibits a stabilizing fat endothermic peak, and an enthalpic area above 35° C. that is less than 10% of the total enthalpic area under the DSC curve. The food has good stability as a filling in shelf stable snack food, and a pleasant texture reminiscent of a stabilized nut butter spread.

A "nut butter," as used herein refers to a composition made from nuts (e.g., peanuts, cashews, almonds, pistachios, walnuts, and the like) ground to a paste, typically after roasting, and including the natural oils and solids from the nuts, and optionally salt, but essentially no other ingredients. Nut butters without any added ingredients are available to consumers, but are often combined with sugar or other sweeteners and sold as "natural" nut butter spreads. Nut butters without any additional ingredients, as well as those combined with sweeteners to produce spreads, but containing no additional fats, often exhibit separation of nut oil from nut solids during shelf life. Natural nut butter spreads are often stirred before consumption to incorporate the oils and ensure that the texture upon eating is creamy.

A nut butter can be combined with a hard fat (e.g., palm stearin, fully hydrogenated soybean oil, or other hard fat), and sometimes additional ingredients (e.g., emulsifiers), to make a stabilized nut butter spread, such as products sold under the brand names Jif® and Skippy®, to reduce or prevent oil separation during shelf life. Stabilized nut butter spreads tend to be more solid at room temperature than natural nut butter spreads, but become softer in the mouth and exhibit a creamy texture when worked with the tongue.

Although nut butters and nut butter spreads can contain up to about 25% by weight protein, they are not suitable for use alone as a filling or topping for shelf stable snack foods because they are prone to problems, such as melting, oil separation, and/or deformation during shipping, handling, or shelf life of such snack foods. As a result, nut butter-based fillings or toppings for shelf stable snack foods include additional ingredients, such as sugars, fillers, and added fats to avoid at least some of the drawbacks of nut butters, but which lower the overall protein content of such nut butter-based fillings or toppings to less than 25% by weight, and alter the characteristic texture attributes of nut butter that consumers particularly enjoy. In addition, simply adding protein ingredients to nut butter-based fillings or toppings results in poor eating qualities, including a drying effect in the mouth (astringency), and a lack of a creamy texture associated with nut butters.

Nut butter-based fillings also generally have less than 50% by weight of their content being nut butter in order to achieve qualities, such as resistance to melting, resistance to deformation, and resistance to oil separation, that make them suitable for use as a filling or topping in a shelf stable snack food.

It was discovered, and is disclosed herein, that a food can be produced that includes at least 50% nut butter by weight, a protein content of at least 25% (e.g., from 25% to about 35%, from about 26% to about 32%, or from about 27% to about 30%) by weight of the food, and has sufficient shelf stability to be used as a filling or topping for shelf stable snack food, yet avoids significant astringency and retains a creamy texture resembling a stabilized nut butter spread.

Ingredients

A food provided herein includes a nut butter in an amount of at least 50% (e.g., 50% to about 65%, about 52% to about 60%, or about 55% to about 58%). Any appropriate nut butter can be used, such as peanut butter, cashew butter, almond butter, pistachio butter, walnut butter, and the like, or any combination thereof. Coconut butter is generally not preferred for a food provided herein. Such a high nut butter content was not previously known in nut butter-based fillings or toppings due to the understanding that such a high nut butter content would suffer from susceptibility to melting, deformation, and oil separation. However, the present application describes a food that avoids such drawbacks. A nut butter content of at least 50% can help impart a good nut butter flavor to a food described herein and ensures that nut butter contributes the highest content by weight of ingredients included in the food.

A food provided herein also includes a powdered protein ingredient in an amount sufficient to provide at least 12% (e.g., from about 13% to about 18%, or from about 14% to about 15%) protein by weight of the food. As used herein, a powdered protein ingredient refers to one or more protein concentrate powder or a protein isolate powder having a protein content of at least 70% (e.g., at least 85%, at least 90%, or at least 95%) by weight of the powdered protein ingredient. Suitable powdered protein ingredients include, for example, dairy protein concentrates and/or isolates (e.g., milk protein, whey, casein, and the like), egg protein ingredients (e.g., egg white), legume protein concentrates and/or isolates (e.g., soybean, lentil, pea, and the like), grain protein concentrates and/or isolates (e.g., wheat, barley, oat, and the like), seed protein concentrates and/or isolates (e.g., sunflower seed, *quinoa*, and the like), bacterial protein concentrates and/or isolates, algal protein concentrates and/or isolates, or any combination thereof. In some embodiments, a combination of powdered protein ingredients can contribute to a preferred texture and/or flavor relative to any one powdered protein ingredient alone. For example, whey can sometimes contribute to a stiffer texture due to agglomeration of the whey protein, while soy can sometimes contribute to an off flavor, but a combination of whey and soy proteins at a ratio of about 70:30 about 30:70 (e.g., about 60:40 to about 40:60, about 55:45 to about 45:55, or about 50:50) can provide a good balance between a preferred texture and a preferred flavor. In another example, egg white, similar to whey protein, can sometimes agglomerate to cause stiffness or hardness of a food product, and combining egg white with a different protein can help to reduce stiffness of the product. In some cases, blending proteins to reduce agglomeration can also contribute to reduced risk of oil separation in a food provided herein.

Preferably, a powdered protein ingredient has particles, where at least 80% (e.g., at least 85%, at least 90%, at least 95%, or at least 98%) of the particles pass through a No. 325 mesh. In some embodiments, at least 80% (e.g., at least 85%, at least 90%, at least 95%, or at least 98%) of the particles in a powdered protein ingredient pass through a No. 400 mesh. A powdered protein ingredient having particles where at least 80% of the particles pass through a No. 325 mesh can provide a smoother texture in a food product provided herein in embodiments where little to no water is available in the food product (e.g., less than 2.5%, less than 2%, or less than 1% moisture content in the food) to solubilize the powdered protein ingredient.

A food provided herein includes a stabilizing fat in an amount of from about 10% to about 20% (e.g., about 12% to about 18%) by weight of the food. A suitable stabilizing fat can have a Mettler Dropping Point (MDP) of from about 38° C. to about 45° C. (e.g., from about 38° C. to about 42° C., or about 38° C. to about 40° C.). A stabilizing fat can have a 10° C. to 40° C. solid fat content ($SFC_{10-40}$) profile having a formula of y=mx+b, where y is solid fat content,
x is temperature in Celsius
m is a slope having a value between about −2 and about −5 (e.g., about −2 to about −3), and
b is a y-intercept having a value between about 95 and about 140 (e.g., about 95 to about 110).

As used herein, a $SFC_{10-40}$ profile for a fat is determined by plotting solid fat content (SFC) values as a function of temperature, where the SFC values are measured at 10° C., 21.1° C., 26.7° C., 33.3° C., and 40° C., and fitting a line to the SFC values using least squares linear regression. The fitted line is the $SFC_{10-40}$ profile for the fat. SFC is measured by nuclear magnetic resonance (NMR) according to AOCS Cd 16b-93 (Firestone, D. (Ed.). (2009). *Official Methods and Recommended Practices of the AOCS* (6$^{th}$ ed.). AOCS Press). A stabilizing fat having a described $SFC_{10-40}$ profile can contribute to a mouthfeel that melts pleasantly in the mouth without creating an unpleasant waxiness.

In some embodiments, a stabilizing fat can have a 26.7° C. to 40° C. solid fat content ($SFC_{27-40}$) profile having a formula of y=mx+b, where y is solid fat content,
x is temperature in Celsius
m is a slope having a value between about −1.5 and about −5 (e.g., about −1.5 to about −2.5), and
b is a y-intercept having a value between about 70 and about 150 (e.g., about 70 to about 85).

As used herein, a $SFC_{27-40}$ profile for a fat is determined by plotting solid fat content (SFC) values as a function of temperature, where the SFC values are measured at 26.7° C., 33.3° C., and 40° C., and fitting a line to the SFC values using least squares linear regression. The fitted line is the $SFC_{27-40}$ profile for the fat. A stabilizing fat having a described $SFC_{27-40}$ profile can contribute to a preferred mouthfeel by ensuring sufficient fat solids are present to reduce perceived astringency and/or particle size of a powdered protein ingredient and/or a powdered food ingredient.

In some embodiments, a stabilizing fat can have a 10° C. to 26.7° C. solid fat content ($SFC_{10-27}$) profile having a formula of y=mx+b, where y is solid fat content,
x is temperature in Celsius
m is a slope having a value between about −1.5 and about −3 (e.g., about −1.8 to about −2.5), and
b is a y-intercept having a value between about 100 and about 130 (e.g., about 105 to about 120).

As used herein, a $SFC_{10-27}$ profile for a fat is determined by plotting solid fat content (SFC) values as a function of temperature, where the SFC values are measured at 10° C., 21.1° C., and 26.7° C., and fitting a line to the SFC values using least squares linear regression. The fitted line is the $SFC_{10-27}$ profile for the fat. A stabilizing fat having a described $SFC_{10-27}$ profile can contribute to a preferred mouthfeel by contributing to a rapid softening of a food in the mouth.

A stabilizing fat suitable for use in a food provided herein can include any appropriate fat, oil, or combinations of fats and/or oils. In some embodiments, a stabilizing fat can include a palm oil, a palm oil fraction, a palm kernel oil, a palm kernel fraction, a coconut oil, a coconut oil fraction, or any combination thereof. For example, in some embodiments, a stabilizing fat can include a palm oil, a palm kernel stearin, and a palm oil stearin. In some embodiments, a stabilizing fat can include one or more fat and/or oil that is interesterified. For example, in some embodiments, a stabilizing fat can include a palm oil, a palm kernel oil or a coconut oil, a palm kernel stearin, and a palm oil stearin, where one or more of the palm oil, a palm kernel oil or a coconut oil, a palm kernel stearin, and a palm oil stearin is interesterified.

In some embodiments, a stabilizing fat provided herein can contribute lauric acid in an amount of about 3% to about 10% (e.g., about 4% to about 8%) by weight of the food. Lauric acid can contribute to a desirable mouthfeel of a food provided herein.

A food provided herein includes a powdered food ingredient in an amount of from about 8% to about 25% (e.g., about 10% to about 20%, or about 10% to about 18%) by weight of the food. As used herein, a powdered food ingredient refers to one or more powdered edible ingredient having a protein content of less than 70% by weight of the powdered food ingredient. A powdered food ingredient can be any appropriate food ingredient, such as a sweetener (e.g., a sugar, a sugar alcohol, a high intensity sweetener, allulose, and the like, or any combination thereof), a flour (e.g., a grain flour, a defatted nut flour, a root flour, and the like, or any combination thereof), a starch (e.g., corn starch, potato starch, and the like, or any combination thereof), a flavorant (e.g., cinnamon, cocoa powder, nutmeg, powdered pepper, and the like, or any combination thereof), salts (e.g., table salt, sea salt, and the like), or any combination thereof.

In some embodiments, a powdered food ingredient can contribute to a desired sweetness of a food provided herein. For example, a powdered food ingredient can include a sugar, a sugar alcohol, or allulose in an amount of from about 6% to about 20% by weight of a food. In some embodiments, a powdered food ingredient can contribute to a desired flavor of a food provided herein. For example, a defatted nut flour can contribute to a nut flavor in a food provided herein. In some embodiments, a powdered food ingredient can contribute to texture of a food provided herein by providing bulk to the food ingredient.

Preferably, a powdered food ingredient has particles, where at least 80% (e.g., at least 85%, at least 90%, at least 95%, or at least 98%) of the particles pass through a No. 325 mesh. In some embodiments, at least 80% (e.g., at least 85%, at least 90%, at least 95%, or at least 98%) of the particles in a powdered food ingredient pass through a No. 400 mesh. A powdered food ingredient having particles where at least 80% of the particles pass through a No. 325 mesh can provide a smoother texture in a food product provided herein in embodiments where little to no water is available in the food product (e.g., less than 2.5%, less than 2%, or less than 1% moisture content in the food) to solubilize the powdered food ingredient.

Additional ingredients can be included in a food provided herein. For example, emulsifiers (e.g., lecithin, or the like), flavorants (e.g., vanilla extract, peanut oil extract, almond extract, or the like), colorants (e.g., extracts, fruit and/or vegetable juices, dyes, and the like), and the like, or any combination thereof, can be included in a food article provided herein. Additional ingredients can be included in a total amount of less than 8% (e.g., less than 5%, or less than 2%).

In some embodiments, a food provided herein can have a moisture content of less than 2.5% (e.g., less than 2%, or less than 1%) by weight.

Stability and Texture

A food provided herein has a shelf stability of at least 60 days (e.g., 90 days, or at least 180 days) with little to no oil separation. In addition, a food provided herein is resistant to melting and deformation in shipping and handling conditions (see, Example 3).

Figure 2:
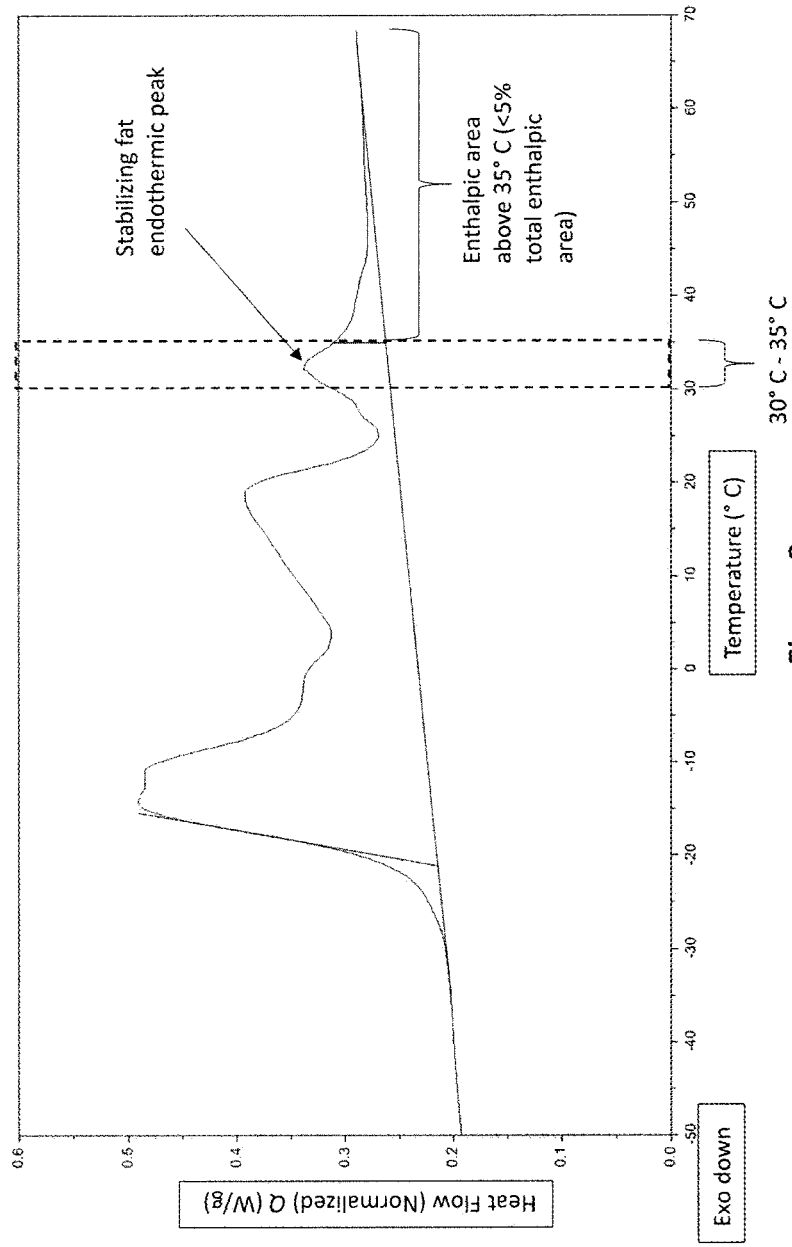
FIG. 2 shows a DSC profile of another food provided herein. The DSC profile exhibits a stabilizing fat endothermic peak, and an enthalpic area above 35° C. that is less than 10% of the total enthalpic area under the DSC curve. The food has good stability as a filling in shelf stable snack food, and a pleasant texture reminiscent of a stabilized nut butter spread.
Figure 3:
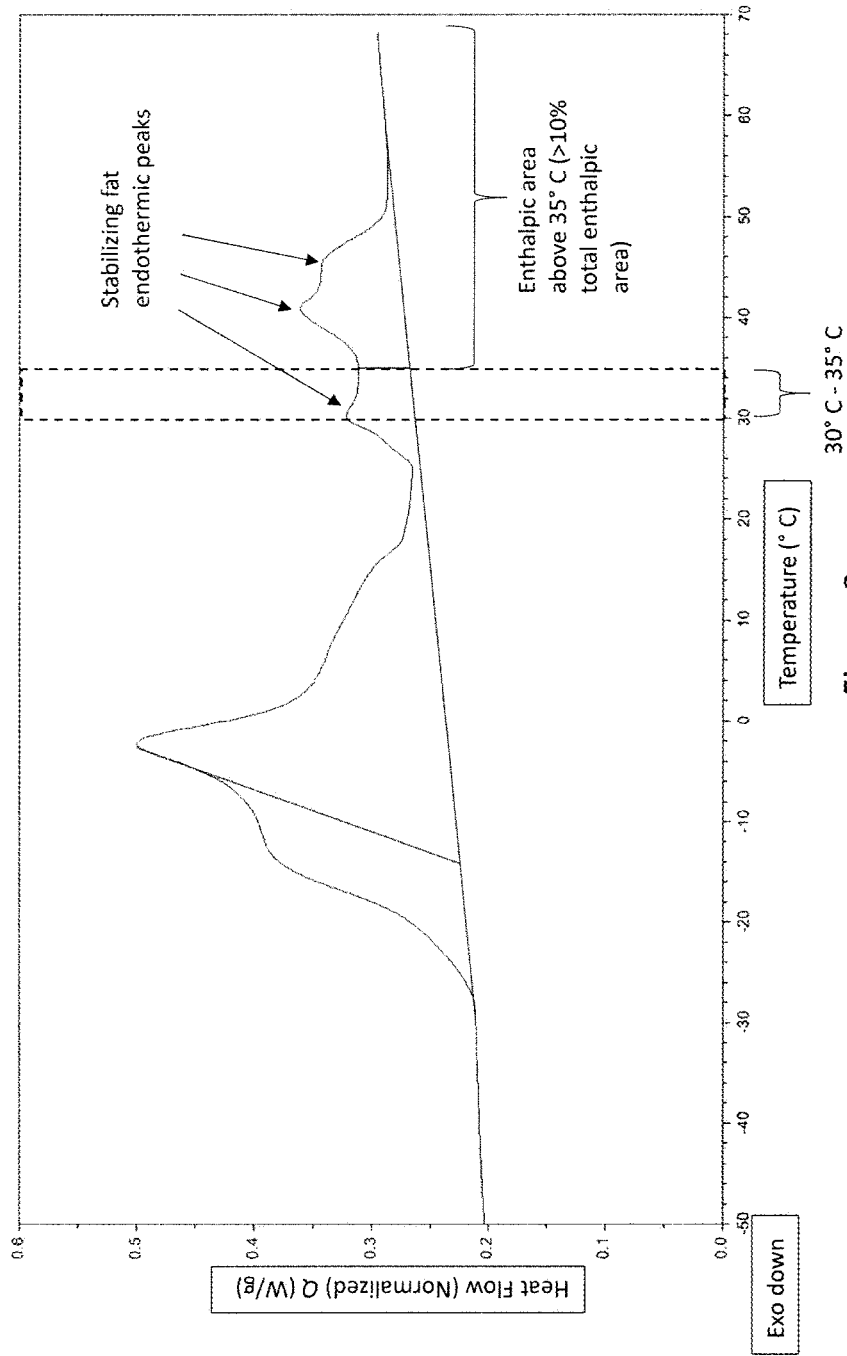
FIG. 3 shows a DSC profile of a comparative filling that contains less than 50% by weight nut butter and a protein content less than 25% by weight. The DSC profile exhibits a stabilizing fat endothermic peak, and an enthalpic area above 35° C. that is greater than 10% of the total enthalpic area under the DSC curve. The food has good stability as a filling in shelf stable snack food, and a pleasant texture reminiscent of a stabilized nut butter spread.
Figure 4:
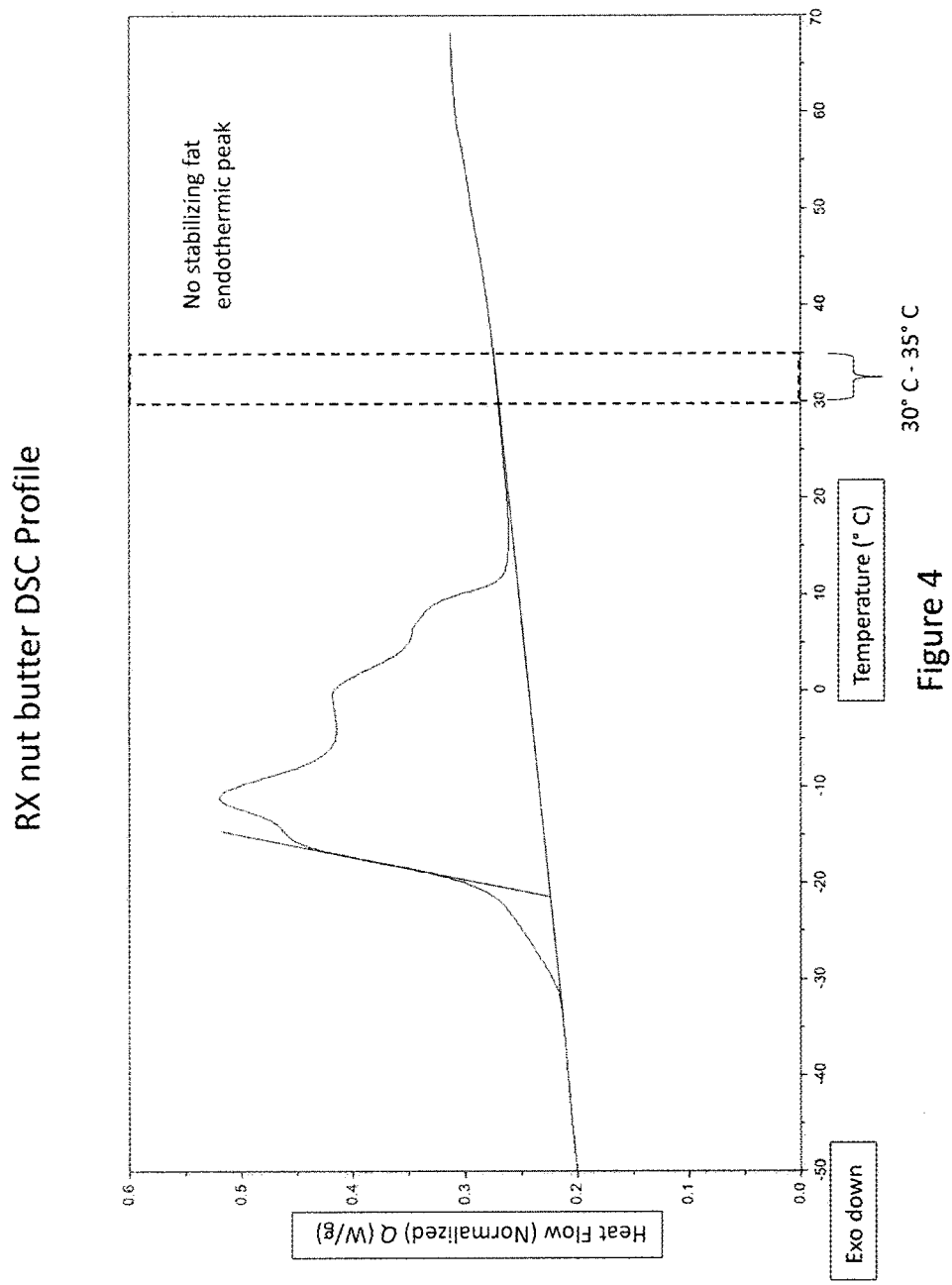
FIG. 4 shows a DSC profile of a comparative commercially available nut butter spread. The DSC profile exhibits no stabilizing fat endothermic peak. The nut butter spread is not suitable as a filling in shelf stable snack food, and has a texture reminiscent of a natural nut butter spread.
Figure 5:
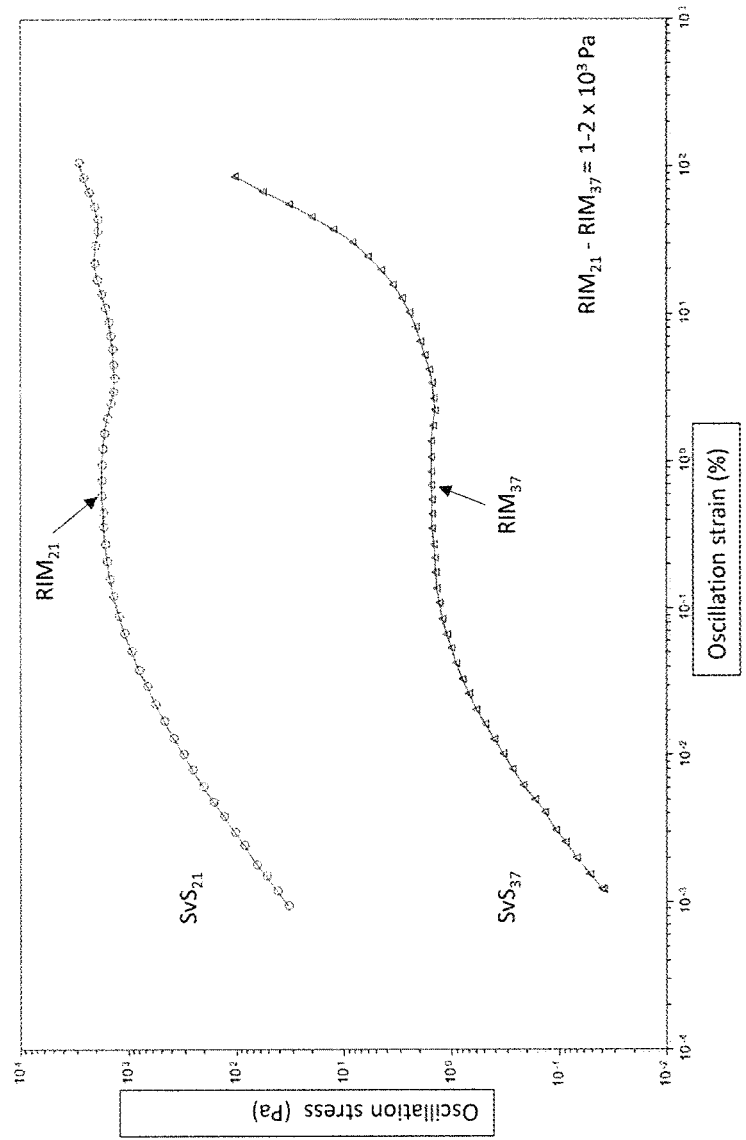
FIG. 5 shows a rheology profile of a food provided herein. The rheology profile exhibits a $RIM_{21}$ that is at least $1 \times 10^1$ Pa greater than the $RIM_{37}$. The food has a pleasant texture reminiscent of a stabilized nut butter spread.
Figure 6:
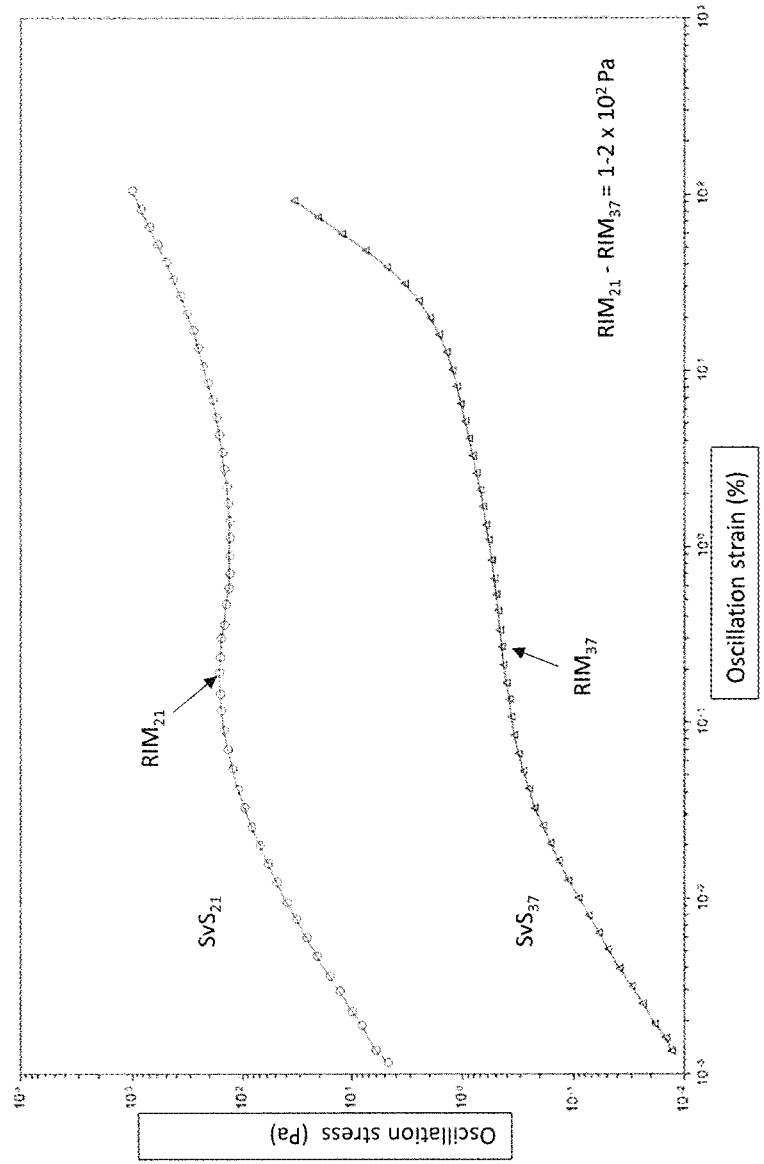
FIG. 6 shows a rheology profile of another food provided herein. The rheology profile exhibits a $RIM_{21}$ that is at least $1 \times 10^1$ Pa greater than the $RIM_{37}$. The food has a pleasant texture reminiscent of a stabilized nut butter spread.
Figure 7:
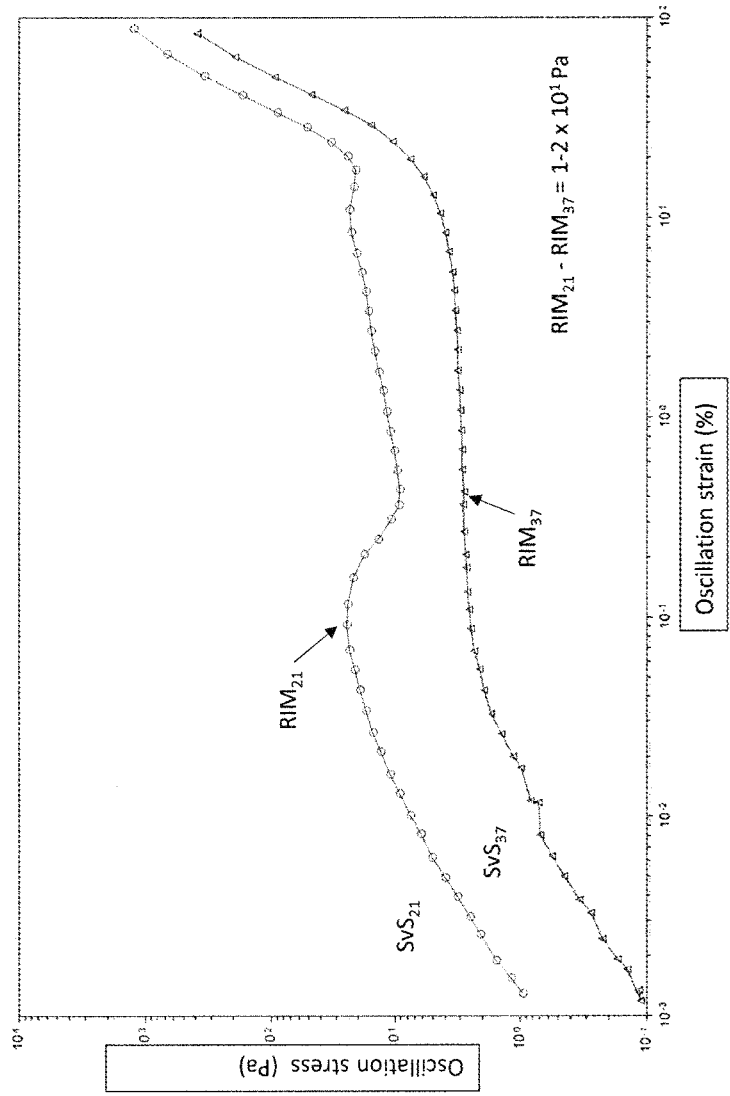
FIG. 7 shows a rheology profile of a comparative filling that contains less than 50% by weight nut butter and a protein content less than 25% by weight. The rheology profile exhibits a $RIM_{21}$ that is at least $1 \times 10^1$ Pa greater than the $RIM_{37}$. The food has a pleasant texture reminiscent of a stabilized nut butter spread.
Figure 8:
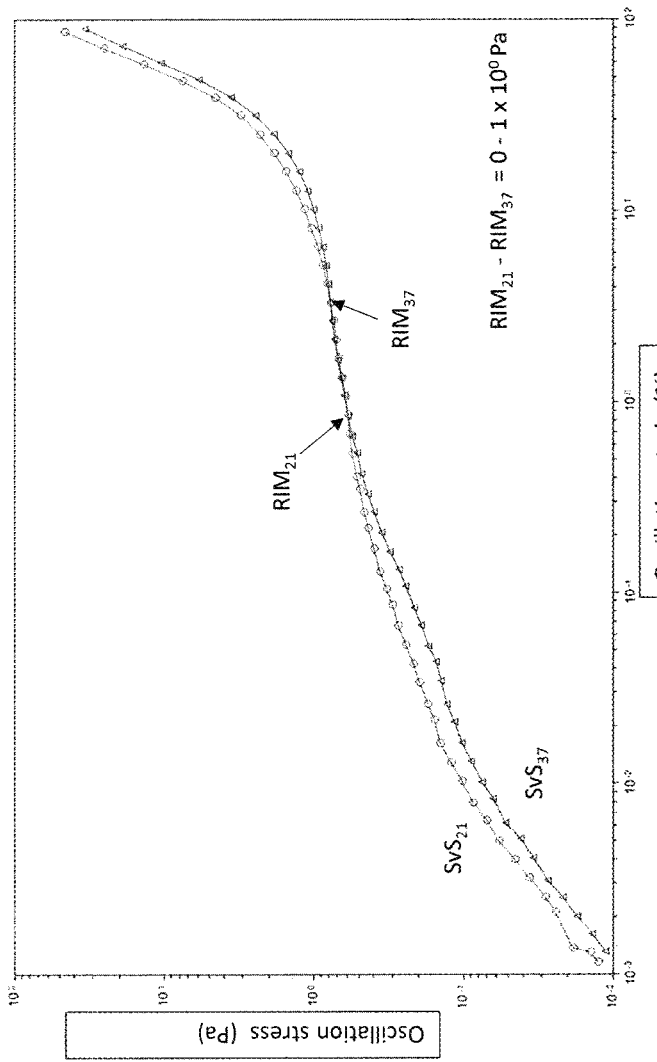
FIG. 8 shows a rheology profile of a comparative commercially available nut butter spread. The rheology profile exhibits a $RIM_{21}$ that is less than $1 \times 10^1$ Pa greater than the $RIM_{37}$. The food has a texture reminiscent of a natural nut butter spread.

In some embodiments, a food provided herein can have a differential scanning calorimetry (DSC) profile predictive of resistance to melting and deformation in shipping and handling conditions. As used herein, a DSC profile predictive of resistance to melting and deformation in shipping and handling conditions includes a stabilizing fat endothermic peak. As used herein, a "stabilizing fat endothermic peak" refers to a DSC endothermic peak occurring at or above 30° C. See, FIG. 1, FIG. 2, and FIG. 3.

In some embodiments, a food provided herein can have a stabilizing fat endothermic peak that is between 30° C. and 35° C., which can be predictive of a texture that melts in the mouth and/or lacks a waxy texture. In some embodiments, a DSC profile can have an enthalpic area above 35° C. that is less than 10% (e.g., 5% or less) of the total enthalpic area of the DSC profile, which can be predictive of a texture that lacks a waxy texture. In addition, a DSC profile with an area above 35° C. that is less than 10% of the total enthalpic area of the DSC profile may be predictive of fewer overall solids at body temperature, especially combined fat solids and protein solids, leaving a cleaner mouthfeel than a DSC profile with an area above 35° C. that is greater than 10% of the total enthalpic area of the DSC profile.

As used herein, a DSC profile is determined using a DSC2500 (TA Instruments; New Castle, DE, USA). Briefly, a sample to be profiled is mixed to ensure homogeneity and placed at room temperature in a non-hermetic pan with about 10 g of sample in the pan. The sample is then tested using the following protocol:

1. Ramp 10° C./minute to −65° C.
2. Isothermal 1.0 minute
3. Ramp 10° C./minute to 70° C.
4. Isothermal 1.0 minute
5. Ramp 10° C./minute to −65° C.
6. Isothermal 1.0 minute
7. Ramp 10° C./minute to 80° C.

DSC profile is recorded at step 3 of the protocol and graphed as shown in FIG. 1, FIG. 2, FIG. 3, and FIG. 4. Total enthalpic area of a DSC profile is the area under the DSC curve (normalized using computer software) and measured during step 3 from −50° C. to 70° C. Enthalpic area above 35° C. is the area of a DSC profile under the DSC curve (normalized using computer software) and measured during step 3 from 35° C. to 70° C. One or more endothermic peaks can be apparent on a DSC profile, but for the purposes of this application, only those at or above 30° C. are considered stabilizing fat endothermic peaks. It is to be understood that a stabilizing fat may contribute to one or more endothermic peak below 30° C. even though they are not referred to as stabilizing fat endothermic peaks.

In some embodiments, a food provided herein can have a rheology profile predictive of a texture resembling a stabilized nut butter spread. As described above, a stabilized nut butter spread tend to be more solid at room temperature than natural nut butter spreads, but becomes softer in the mouth and exhibits a creamy texture when worked with the tongue. As used herein, a rheology predictive of a texture resembling a stabilized nut butter spread includes a rheology inflection midpoint at 21° C. ($RIM_{21}$) and a rheology inflection midpoint at 37° C. ($RIM_{37}$), where the $RIM_{21}$ is at least $1\times10^1$ (e.g., at least $1\times10^2$, or from $1\times10^2$ to $1\times10^4$) Pascals (Pa) greater than the $RIM_{37}$. Such a rheology differs from a texture resembling a natural nut butter spread, which can have a $RIM_{21}$ that is less than $1\times10^1$ Pa greater than the $RIM_{37}$. Without being bound by theory, it is believed that a food with a $RIM_{21}$ at least $1\times10^1$ Pa greater than a $RIM_{37}$ predicts a texture resembling a stabilized nut butter spread by reflecting a shear resistance of a food that is greater upon first being place in the mouth (e.g., at room temperature) as compared to shear resistance once the food has warmed in the mouth, which could be perceived as becoming creamier as it is worked with the tongue.

As used herein, a rheology profile is determined using an ARG2 Rheometer (TA Instruments) equipped with a Peltier thermal control system using upper brushed and lower crosshatched 40 mm parallel plates. Briefly, a sample to be profiled is mixed to ensure homogeneity before testing, then subjected to an initial thermal conditioning step at 21° C. for 15 minutes. Following the initial thermal conditioning step, an oscillatory amplitude ramp is done with a frequency of 1 Hz and a ramp strain of from 0.001% to 100% as a rheological conditioning step. Following the rheological conditioning step, the sample is equilibrated to 37° C. for 15 minutes and subjected to an oscillatory amplitude ramp done with a frequency of 1 Hz and a ramp strain of from 0.001% to 100% as a first measuring step, and a stress versus strain ($SvS_{37}$) curve is plotted from the data generated. Following the first measuring step, the sample is equilibrated to 21° C. for 15 minutes and subjected to an oscillatory amplitude ramp is done with a frequency of 1 Hz and a ramp strain of from 0.001% to 100% as a second measuring step, and a stress versus strain ($SvS_{21}$) curve is plotted from the data generated. $RIM_{21}$ and $RIM_{37}$ are determined from the $SvS_{21}$ and $SvS_{37}$ curves, respectively, using the following method. A first derivative (wrt X) curve is generated from the appropriate SvS curve. The point closest to or at zero on the first derivative curve is identified. The stress value on the SvS curve coinciding with the point at or closest to zero on the first derivative curve is determined to be the rheology inflection midpoint for the SvS. See, FIG. 5, FIG. 6, FIG. 7, and FIG. 8.

Methods of Making and Use

A food provided herein can be used as a filling or topping for a snack food of any appropriate form. For example, a food provided herein can be applied to a biscuit or cracker, a cookie, or a bar. In some embodiments, a food provided herein can be used to fill an indentation on a surface of a snack bar or cookie. In some embodiments, a food provided herein can be used along as a cream layer between them two or more snack foods. In some embodiments, a food provided herein can be stored prior to use as a topping or filling in any suitable container. A snack food article including a food provided herein can be packaged in any suitable packaging, such as a foil or plastic wrapper.

Also provided herein are methods of making a food provided herein. Any appropriate method and equipment can be used to make a food provided herein. Ingredients used to make a food provided herein can be combined in any suitable order to produce the food. In some embodiments, methods and conditions of making a food provided herein can be designed to render the food, or ingredients or combinations of ingredients used to make the food, suitable for use in a food manufacturing setting. For example, a method of making a food provided herein can be designed to ensure that the food, ingredients used to make the food, or combinations of ingredients used to make the food are pumpable using standard food manufacturing equipment.

In some embodiments, a stabilizing fat can heated to a temperature sufficient to ensure melting of the stabilizing fat and combined with a nut butter using equipment and sufficient shear to achieve complete mixing of the nut butter and stabilizing fat before adding the remaining ingredients. For example, a stabilizing fat can be heated to a temperature at or above the melting point of the stabilizing fat before or after combination of the stabilizing fat with a nut butter and mixed to homogeneity to make a fat and nut butter mixture. A fat and nut butter mixture can then be combined with a powdered protein ingredient and a powdered food ingredient to make a food provided herein.

In some embodiments, shear used during making, pumping, or storing a food provided herein can be sufficient to ensure mixing, but low enough to prevent significant agglomeration of powdered protein ingredients. In some embodiments, temperature used during making, pumping, or storing a food ingredient can be selected to ensure mixing of ingredients and/or pumpability of the food and/or ingredients to make the food, but low enough to prevent heat damage to ingredients in the food.

In one embodiment of a method of making a food, a nut butter is mixed in a heated mixer and stabilizing fat is added and mixed at a temperature of from about 45° C. to about 70° C. (e.g., about 50° C. to about 65° C., or about 60° C.) for sufficient time to ensure complete melting of the stabilizing fat and complete mixing of the fat and nut butter to make a fat and nut butter mixture. The fat and nut butter mixture is combined with powdered protein ingredient, powdered food ingredient, and any additional ingredients at a temperature of from about 45° C. to about 70° C. (e.g., about 50° C. to about 65° C., or about 60° C.) for sufficient time to produce a food described herein. The food can be optionally temperature adjusted to achieve a temperature suitable for extrusion on a snack food piece (e.g., about 40° C. to about 65° C., or about 45° C. to about 60° C.). The food can be optionally stored at a temperature above 38° C. (e.g., about 40° C. to about 60° C., or about 45° C. to about 60° C.) before application of the food to a snack food piece. In some embodiments, a food can be stored at a temperature above 38° C. for limited time (e.g., less than 6 hours, less than 5 hours, or less than 4 hours) to prevent development of flavor off-notes and/or prevent protein agglomeration.

A food provided herein can be applied as a topping or a filling for a shelf stable snack food using any appropriate equipment and method. For example, a food provided herein can be extruded onto a snack food piece.

The following examples are provided to show selected embodiments of the invention described herein. The examples are not intended to limit the invention to any particular embodiment.

EXAMPLES

Example 1

Several formulations of a nut butter-based filling were produced. Formulations are described in Table 1. Formulation 3 was included as a control. Formulation 3 was a filling already available in a shelf-stable snack food that has good texture, similar to a stabilized nut butter spread. Formulation 3 represents a filling with relatively high nut butter content compared to other fillings that contain nut butter, but has a protein content less than 25%. Total protein content in Formulations 1, 2, and 4 was 25-30%, while the total protein content in Formulation 3 was 8-12%. SPI refers to soy protein isolate in Table 1. WPI refers to whey protein isolate in Table 1.

TABLE 1

| | Formulation | | | |
|---|---|---|---|---|
| Ingredient | 1 % weight | 2 % weight | 3 % weight | 4 % weight |
| Peanut butter | 55-58 | 52-56 | 35-45 | 0 |
| Almond butter | 0 | 0 | 0 | 55-60 |
| SPI | 5-9 | 5-9 | 0 | 5-9 |
| WPI | 5-9 | 5-9 | 0 | 5-9 |
| Fat A | 10-15 | 0 | 0 | 0 |
| Fat B | 0 | 15-20 | 0 | 0 |
| Fat C | 0 | 0 | 17-22 | 0 |
| Fat D | 0 | 0 | 0 | 15-20 |
| Powdered food ingredient | 15-20 | 8-13 | 17-22 | 10-15 |
| Other | 0 | 0-3 | 0 | 0 |

TABLE 2 describes each of the fats from Table 1.

| | Fat A | Fat B | Fat C | Fat D |
|---|---|---|---|---|
| MDP | 38-42 | 38-40 | 40-45 | 40-43 |
| $SFC_{10-40}$ slope | −3 to −3.4 | −2.5 to −3 | −1.7 to −2 | −2.8 to −3.2 |
| $SFC_{10-40}$ y-intercept | 125-135 | 100-110 | 80-85 | 125-135 |
| $SFC_{10-27}$ slope | −1.8 to −2.2 | −2.5 to −2.9 | −2 to −2.4 | −1.8 to −2.2 |
| $SFC_{10-27}$ y-intercept | 105-115 | 105-115 | 85-90 | 110-120 |
| $SFC_{27-40}$ slope | −3.4 to −3.7 | −1.7 to −2.0 | −1.4 to −1.7 | −3.3 to −3.6 |
| $SFC_{27-40}$ y-intercept | 135-145 | 75-85 | 67-72 | 135-145 |
| Lauric acid content (% by weight) | 40-45 | 35-40 | 3-7 | 35-40 |

Formulation 3 had a creamy texture resembling a stabilized nut butter spread with little to no astringency, and an enjoyable peanut butter flavor. It was observed that each of Formulations 1, 2, and 4 each produced a food that was high in protein and suitable for a filling in a shelf stable snack food, and with a pleasant mouthfeel resembling a stabilized nut butter spread. Formulations 1 and 4 had a creamy texture and good nut butter flavor, with slightly more astringency than Formulation 3, which might be partially attributable to less sweetness than Formulation 3. Formulations 1 and 4 were observed to melt pleasantly in the mouth, leaving a slight perception of solids in the mouth following melting. Formulation 2 also had a creamy texture, with even less astringency than Formulations 1 and 4. None of the formulations exhibited noticeable oil separation over at least a 90 day shelf life at room temperature.

Example 2

Fillings from Table 1 were subjected to rheological testing as described above, and compared to a commercially available high protein nut butter spread (RX Nut Butter™ peanut butter in packet packaging; Kellogg's, Battle Creek, MI, USA). It was observed that the commercially available high protein nut butter spread exhibited high levels of oil separation, and needed to be kneaded in the packet to encourage reincorporation of the oil into the other ingredients in the packet. As a result, the commercially available nut butter spread was first kneaded to combine the ingredients, while the fillings from Table 1 were simply stirred before allowing the samples to rest prior to rheology measurements. Without being bound by theory, it is believed that the oil separation in the commercially available product may have been due, in part, to a lack of stabilizing fat and exacerbated by agglomeration of egg white protein used to increase protein content in the product.

Each of the $RIM_{21}$ and $RIM_{37}$ values were determined for Formulation 1, Formulation 2, Formulation 3, and the high protein nut butter spread. $RIM_{21}$ was at least $1 \times 10^1$ Pa greater than $RIM_{37}$ for each of Formulations 1, 2, and 3, with $RIM_{21}$-$RIM_{37}$ being $1$-$2 \times 10^3$ Pa, $1$-$2 \times 10^2$ Pa, and $1$-$2 \times 10^1$ Pa, respectively. This was consistent with an eating experience that was reminiscent of a stabilized nut butter spread, where the filling becomes less resistant to shear applied by the tongue as the filling warms in the mouth. The $RIM_{21}$-$RIM_{37}$ for the high protein nut butter spread was less than $1 \times 100$ Pa, which is consistent with an eating experience reminiscent of a natural nut butter spread, which has a similar resistance to shear applied by the tongue immediately after being placed in the mouth as when it warms to body temperature.

Example 3

Figure 9:
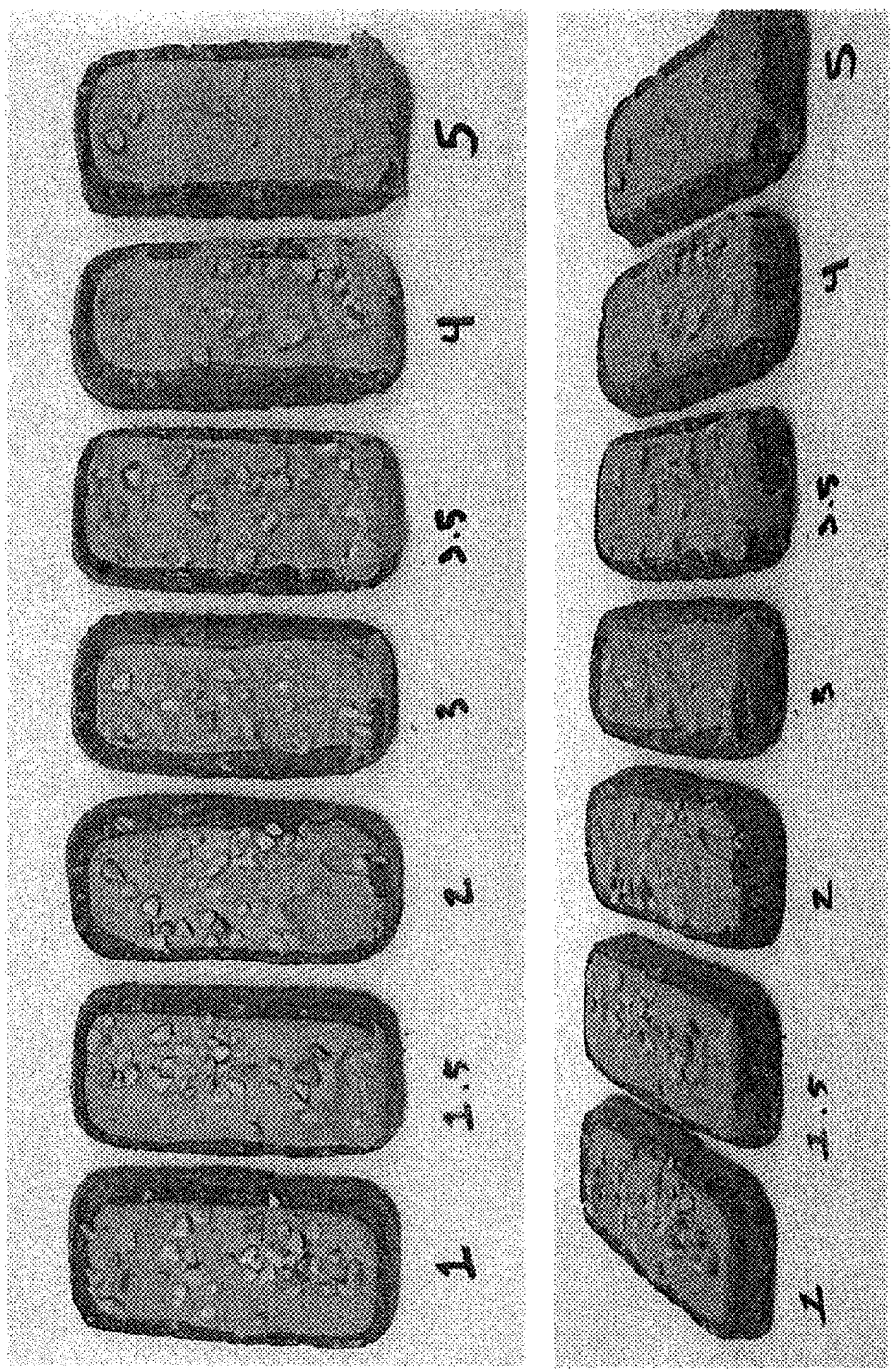
FIG. 9 shows a visual scale from a top view (upper) and an end view (bottom) for determining whether a food is resistant to melting and deformation in shipping and handling conditions (see, Example 3).

Fillings from Table 1 were used to fill an indentation on the top of a baked biscuit, then the filled biscuits were individually wrapped in a foil package and placed in a paperboard carton with each of the biscuits oriented in the same way. Cartons of each product were stored in a flat orientation, with the filled indentations oriented upward, in conditions in Table 3, then placed on a vibrating table in the same orientation for 1 hour. Control was not shaken. The cartons were allowed to reach room temperature before filled biscuits were taken out of pouches to determine the stability of the filling based on the scale shown in FIG. 9, with 1 being the most stable and 5 being most unstable. Table 4 shows the results of the average score for each tested condition and filling. A filling was considered resistant to melting and deformation in shipping and handling conditions, if it had an average score of 3 or less in Condition D and/or had an average score of 2 or less in Condition A or B.

TABLE 3

| Condition | Description | Notes |
|---|---|---|
| Control | 70° F. | Not shaken |
| A | 100° F. 24 hrs | Similar to conditions for an outer cube for 4 days in typical summer truck |
| B | 105° F. 24 hrs | |
| C | 110° F. 4 hrs | |
| D | 113° F. 4 hrs | Similar to conditions for an outer cube for 1 day in a |

TABLE 3-continued

| Condition | Description | Notes |
|---|---|---|
| | | stationary hot truck on a very hot day |

TABLE 4

| | Condition | | | |
|---|---|---|---|---|
| Formulation | A | B | C | D |
| 1 | 1-1.5 | N/A* | N/A | 2.0 |
| 2 | 1-1.5 | 1.5 | 2.0 | 2.5-3 |
| 3 | 1-1.5 | N/A | N/A | 2-2.5 |

*N/A - not done

As can be seen in Table 4, Formulations 1 and 2 performed as well as Formulation 3, which has a lower nut butter content and a lower protein content. Additional formulations were also tested. It was noted that as the nut butter content increased, the stability in Condition D decreased, although the stability at Condition A was relatively stable. A formulation with about 60% nut butter content, a WPI+SPI content of about 15-16% by weight, a powdered food ingredient content of about 14% to about 16%, and a Fat B content of about 12-14% by weight had an average score of 1 to 1.5 in Condition A, but had an average score of 3.5 in Condition D. However, stability of the formulation may be improved by using, for example, a higher powdered food ingredient content, a higher powdered protein ingredient content, or by using a fat having an $SFC_{27-40}$ slope closer to −1.5 than Fat B. In contrast, a formulation that was identical to Formulation 2, but using a fat with a Mettler Drop Point below 38° C. instead of Fat B, had an average score greater than 2 at Condition A.

Example 4

Formulations from Table 1 were subjected to DSC testing to observe melting characteristics contributing to shelf stability as a filling, as well as a desirable eating experience. DSC profiles were obtained according to the method described above. The DSC profiles of Formulations from Table 1 were compared to the DSC profile of the commercially available high protein nut butter spread described in Example 2.

Upon removal from the packet, based on visual observation, the commercially available nut butter spread had a thinner consistency than the fillings from Table 1, and would not have been suitable as a filling due being too runny at room temperature. Upon eating, the commercially available product had a consistency similar to a natural nut butter spread, but with moderate astringency and solids that contributed to a toothpack texture. There was very little difference in texture from when the commercially available product was first put into the mouth and after it had warmed in the mouth, suggesting that little to no melting was occurring in the mouth. This was consistent with the DSC profile of the commercial product, which showed no stabilizing fat endothermic peak above room temperature, suggesting that the fat content in the product is liquid at room temperature. See, FIG. 4.

In contrast to the commercially available nut butter spread, Formulations 1, 2, and 3 exhibited at least one stabilizing fat endothermic peak (endothermic peak at or above 30° C.). Each of Formulations 1, 2, and 3 have a suitable structure for being used as a filling or topping in a shelf stable snack food. See, Example 3. It is believed that having a stabilizing fat endothermic peak at or above 30° C. is predictive of stability against melting and deformation during shipping, handling, and storage condition, with higher peaks being predictive of more stability. However, stabilizing fat endothermic peaks exceeding 45° C. can be predictive of a texture that is more likely to be waxy due to higher solids content at higher temperatures, with higher peaks being more predictive of a greater degree of waxiness. Without being bound by theory, it is believed that the stabilizing fat endothermic peaks of Formulations 2 and 3, being between 30° C. and 35° C., in combination with high protein content, provide sufficient resistance to melting and deformation during shipping, handling, and storage conditions. In addition, the enthalpic area above 35° C. is generally very low in Formulations 1 and 2, suggesting fewer fat solids at temperatures at or above body temperature, which could otherwise combine with protein solids to produce a poor mouthfeel.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A food, comprising:
    a. nut butter in an amount of at least 50% by weight of the food;
    b. at least 25% protein by weight of the food, the protein including a powdered protein ingredient contributing at least 12% protein by weight of the food, the powdered protein ingredient having a protein content of at least 70% by weight of the powdered protein ingredient;
    c. a stabilizing fat in an amount of about 10% to about 20% by weight of the food, wherein the stabilizing fat comprises palm oil, palm kernel stearin, and palm oil stearin, and contributes lauric acid in an amount of about 3% to about 10% by weight of the food, wherein the stabilizing fat has a Mettler Dropping Point of from about 38° C. to about 45° C., and a 10° C. to 40° C. solid fat content ($SFC_{10-40}$) profile, the $SFC_{10-40}$ profile having a formula of y=mx+b, where
    y is solid fat content,
    x is temperature in Celsius,
    m is slope having a value between about −2 and about −5, and
    b is a y-intercept having a value between about 95 and about 140, and the stabilizing fat has a 26.7° C. to 40° C. solid fat content ($SFC_{27-40}$) profile, the $SFC_{27-40}$ profile having a formula of y=mx+b, where
    y is solid fat content,
    x is temperature in Celsius,
    m is slope having a value between about −1.5 and about −5, and
    b is a y-intercept having a value between about 70 and about 150, and the stabilizing fat has a 10° C. to 26.7° C. solid fat content ($SFC_{10-27}$) profile, the $SFC_{10-27}$ profile having a formula of y=mx+b, where
    y is solid fat content,
    x is temperature in Celsius,
    m is slope having a value between about −1.5 and about −3, and
    b is a y-intercept having a value between about 100 and about 130;

d. a powdered food ingredient in an amount of about 8% to about 25% by weight of the food, the powdered food ingredient having a protein content of less than 70% by weight of the powdered food ingredient;

e. a differential scanning calorimetry (DSC) profile having a stabilizing fat endothermic peak between 30° C. and 35° C., wherein the DSC profile exhibits a curve that has less than 10% of its area between 35° C. and 70° C.;

f. a rheology inflection midpoint at 21° C. ($RIM_{21}$) and a rheology inflection midpoint at 37° C. ($RIM_{37}$), where the $RIM_{37}$ is at least $1\times10^1$ Pa greater than the $RIM_{21}$; and g. a moisture content of less than 2.5% by weight of the food, wherein the moisture content does not solubilize the powdered protein ingredient and does not solubilize the powdered food ingredient.

2. The food of claim 1, wherein the stabilizing fat has a $SFC_{10-40}$ profile with a formula of y=mx+b, where y is solid fat content, x is temperature in Celsius, m is slope having a value between about −2 and about −3, and b is a y-intercept having a value between about 95 and about 110.

3. The food of claim 1, wherein the stabilizing fat has a $SFC_{27-40}$ profile with a formula of y=mx+b, where y is solid fat content, x is temperature in Celsius, m is slope having a value between about −1.5 and about −2.5, and b is a y-intercept having a value between about 70 and about 85.

4. The food of claim 1, wherein the stabilizing fat has a $SFC_{10-27}$ profile with a formula of y=mx+b, where y is solid fat content, x is temperature in Celsius, m is slope having a value between about −1.8 and about −2.5, and b is a y-intercept having a value between about 105 and about 120.

5. The food of claim 1, wherein the $RIM_{37}$ is from about $1\times10^2$ to $1\times10^4$ Pa greater than the $RIM_{21}$.

6. The food of claim 1, wherein the food includes nut butter in an amount of from 50% to about 65% by weight of the food.

7. The food of claim 1, wherein the nut butter comprises peanut butter, almond butter, or cashew butter.

8. The food of claim 1, wherein the powdered food ingredient comprises a sugar or a sugar alcohol in an amount of about 6% to about 20% by weight of the food.

9. The food of claim 1, wherein the powdered protein ingredient comprises whey protein and soy protein, the whey protein and soy protein included at a ratio of from about 30:70 to about 70:30.

10. The food of claim 1, wherein the powdered protein ingredient comprises whey protein isolate in an amount of from about 5% to about 15% by weight of the food and soy protein isolate in an amount of from about 5% to about 15% by weight of the food.

11. The food of claim 1, wherein the food comprises a defatted nut flour in an amount of up to about 10% by weight of the food.

12. The food of claim 1, wherein the powdered protein ingredient and the powdered food ingredient each include particles, where at least 80% of the pass through a No. 325 mesh.

* * * * *